United States Patent [19]
Martyashin et al.

[11] 3,848,186
[45] Nov. 12, 1974

[54] METHOD OF MEASURING PARAMETERS OF COMPLEX ELECTRIC CIRCUIT AND DEVICE FOR EFFECTING SAME

[76] Inventors: Alexandr Ivanovich Martyashin, ulitsa Kirova, 69, kv. 59; Andrei Elizarovich Morozov, ulitsa Uritskogo, 44/10, kv. 62; Eduard Konstantinovich Shakhov, ulitsa Gladkova, 13, kv. 5; Viktor Mikhailovich Shlyandin, ulitsa Lermontova, 12, kv. 17, all of Penza, U.S.S.R.

[22] Filed: Aug. 24, 1973

[21] Appl. No.: 391,315

[52] U.S. Cl. .............................................. 324/57 R
[51] Int. Cl. ............................................. G01r 27/00
[58] Field of Search .................................. 324/57 R

[56] References Cited
UNITED STATES PATENTS

| | | | |
|---|---|---|---|
| 2,577,592 | 12/1951 | Shiepe | 324/57 R |
| 2,604,511 | 7/1952 | Marzolf | 324/57 R |
| 2,626,981 | 1/1953 | Shiepe | 324/57 R |
| 3,017,571 | 1/1962 | Moricca et al. | 324/57 R X |
| 3,432,752 | 3/1969 | Frederickson et al. | 324/57 R |
| 3,480,857 | 11/1969 | Bialko et al. | 324/57 R |
| 3,624,494 | 11/1971 | Turan | 324/57 R |

*Primary Examiner*—Stanley T. Krawczewicz
*Attorney, Agent, or Firm*—Eric H. Waters

[57] ABSTRACT

The method of measuring the parameters of a complex electrical circuit, including measuring the parameters of complex RC and RL circuits of diverse radio electronic devices, measuring the parameters of film RC components, and measuring the signals emitted by RCL transducers and microtransducers by varying the character of electrical effects acting upon electrical measuring circuit. A device for carrying out the method of measuring the parameters of a complex electrical circuit, including a keying unit whose first input is connected to the output of a source of constant voltage, while a second input is grounded, connecting upon arrival of a signal from a control unit, coinciding in time with an external signal, its first input to its output, the output of the keying unit being connected through a complex electric circuit to a lead of a reference element, electrically connected to a voltage measuring unit and to a comparison unit, or through the reference element to the lead of the complex electric circuit.

12 Claims, 5 Drawing Figures

METHOD OF MEASURING PARAMETERS OF COMPLEX ELECTRIC CIRCUIT AND DEVICE FOR EFFECTING SAME

The present invention relates to electrical measurement techniques, and in particular, to a method of measuring the parameters of a complex electric circuit and a device for effecting same.

The method of measuring the parameters of a complex electric circuit and device for effecting same, according to the present invention, are mainly used for measuring the parameters of complex RC and RL circuits of diverse radioelectronic devices, and they can likewise be used for measuring the parameters of film RC components and for measuring the signals emitted by RCL transducers and microtransducers.

Known in the art is a method of measuring the parameters of a complex electric circuit, wherein to an electric measuring circuit including a complex electric circuit, is supplied an electric signal, the parameters of electric signals derived from the output of a measuring electric circuit being converted into time intervals, the values thereof being used for determining the parameters of the complex electric circuit.

In the prior art method of measuring the parameters of a complex electric circuit a constant voltage is applied to the input of the electric measuring circuit, which is made up of a voltage divider composed of a series-connected reference resistor and parallel RC circuit when the latter parameters are being measured, a series-connected series RL circuit and reference resistor when the series RL circuit parameters are being measured, a series-connected RC circuit and reference capacitor when the series RC circuit parameters are being measured. Hereat a transient process is initiated in the electric measuring circuit, determining the alteration of voltage across its output, i.e. the output of said voltage divider. As the transient process practically terminates, under steady state condition, from the output of the electric measuring circuit is derived a constant voltage, which is stored and converted into a time interval, which is then measured. Then a zero potential voltage is applied to the input of the electric measuring circuit and the time is measured from the instant the voltage is applied until the instant the voltage of repeatedly initiated transient process derived from the output of the electric measuring circuit, equals a definite portion of previously stored constant voltage.

In the prior art method of measuring the parameters of a complex electric circuit hereinabove described, the values of the time intervals obtained are not connected by linear dependences with the values of components and the time constant of the complex electric circuit, while in order to obtain segregated information about the values of components and time constant of a complex electric circuit, mathematical handling of digital equivalents, obtainable when measuring said time intervals, is required. Besides, said method of measuring the parameters of a complex electric circuit fails to effect the measurement of values of components and time constant of the parallel RL circuit, since in this case the measuring electric circuit must be composed of a series-connected reference inductance coil and parallel RL circuit, and in the steady-state duty the voltage derived from the output of said circuit will be determined not by the value of inductance L in the inductance coil of the parallel RL circuit, but by the ratio of leakage resistances in the inductance coil of the parallel RL circuit and the reference inductance coil.

These disadvantages limit to a great extent the field of application of said method for measuring the complex electric circuit parameters due to poor measurement accuracy (because of non-linearity of conversion function) of the values of components and time constant of the parallel RC circuit and series-connected RL and RC circuits and because the measurement of the values of components and time constant of the parallel RL circuit is practically impossible.

Known in the art is a device for executing the method of measuring the parameters of a complex electric circuit, wherein a keying unit, whose first input is connected to the output of a source of constant voltage, while the second input is grounded, connects, on the arrival of a signal sent by the control unit coinciding in time with an external signal, its first input to its output, the output of the keying unit being connected via a complex electric circuit to the leadout of the reference element, electrically connected to a voltage measuring unit or a comparison unit, or via the reference element connected to a leadout of the complex electric circuit electrically connected to the voltage measuring unit and the comparison unit, the output thereof being connected to the input of the control unit, connected, in its turn, to the time interval measuring unit.

With the external signal arriving at the control unit, the latter sends a governing pulse to the keying unit, following which the latter connects the output of a source of constant voltage to the input of the electric measuring circuit featuring a series-connected reference resistor and parallel RC circuit, in case the latter's parameters are being measured, a series-connected series RL circuit and reference resistor in case the series connected RL circuit parameters are being measured, a series-connected series RC circuit and reference capacitor in case the parameters of series RC circuit are being measured, the other input of the measuring electric circuit being connected to the grounded input of the keying unit. Following the time required for practical termination of the transient process initiated in the measuring electric circuit, the control unit sends a signal to the voltage measuring unit and to the storage, the input thereof being connected to the output of the electric measuring circuit, i.e. common connection point of the reference element and the complex electric circuit, while the output is connected to one of the inputs of the comparison unit via a,$e^{-1}$ ratio voltage divider. Basing on this signal the storage accumulates the output voltage of the electric measuring circuit, while the voltage measuring unit, whose input is connected to the output of the electric measuring circuit, takes measurement of the output voltage of the latter circuit. Then the control unit sends a signal governing the connection of the input of the measuring electric circuit to its grounded input, while the time interval measuring unit starts measuring the time interval, the signal derived therefrom being sent to the time interval measuring unit from the comparison unit at the moment the voltage of the repeatedly initiated transient process, derived from the output of the electric measuring circuit, equals the voltage derived from the output of the voltage divider.

When measuring the parameters of a complex electric circuit employing said device, high accuracy of measurements cannot be obtained, since the digital equivalents of the voltage and time interval are not connected by linear dependence with the parameters of the complex electric circuit. Moreover, a digital equivalent of the time interval, whose termination is registered by the comparison unit, depends, at the same time, on the values of both components of the complex electric circuit, while the digital equivalent of such an essential parameter of the complex electric circuit as the time constant, is practically not measured. The accuracy of measurement is additionally reduced due to shunting of the complex electric circuit or reference element by the input impedance of the comparison unit. A substantial disadvantage is also the failure to measure the parameters of parallel RL circuit due to the fact that after the initial transient process terminates the current (and hence the output voltage) in the electric measuring circuit, featuring in this case a series-connected reference inductance coil and parallel RL circuit, is determined not by the value of the inductance L in the inductance coil of the parallel RL circuit, but by the ratios of leakage resistances in the reference inductance coil and the parallel RL circuit.

It is an object of the present invention to provide a method of measuring the parameters of a complex electric circuit and a device for effecting same, wherein variation of the character, of electrical effects acting upon the electric measuring circuit would increase its accuracy of measurements and make the process quicker.

This object is attained in a method of measuring the parameters of a complex electric circuit, wherein to the electric measuring circuit including the complex electric circuit, is applied an electric signal, and the parameters of electric signals derived from the output of the electric measuring circuit are converted into time intervals, the values thereof being used for determining the parameters of the complex electric circuit, according to the invention, a constant voltage is used as the electric signal, which is applied directly across the input of the complex electric circuit in case the components thereof are connected in parallel, or linearly changing or constant current, which is applied to the complex electric circuit in case the components thereof are connected in series, and in order to convert the electric signal derived from the output of the electric measuring circuit into the time intervals, the current or the integral of current flowing through the complex electric circuit is compared in case the components thereof are connected in parallel with two reference currents, one with the lesser value exceeding the time constant of said current, or the integral of current, or the voltage derived from the complex electric circuit in case the components thereof are connected in series with two reference voltages, one with the lesser value exceeding the time constant of said voltage, and the time interval is measured counting from the instant said current or the integral of current equals two reference currents, or said voltage equals two reference voltages, then after a calibrated time interval, exceeding the value of the time constant of the complex electric circuit, which is counted from the instant constant voltage, or linearly changing current, or constant current, is applied to said complex electric circuit, the polarity of said applied constant voltage is reversed, or the direction of application of linearly changing current is reversed, or the direction of constant current is reversed, and the time interval is measured, counting from this instant until said current or the integral of current flowing through the complex electric circuit in case the components thereof are connected in parallel, or voltage derived from the complex electric circuit in case the components thereof are connected in series, equals approximately to zero, then said constant voltage applied is cut off or the reversal of the linearly changing current is discontinued or the constant current supply is cut off and the current or the integral of current flowing through the complex electric circuit in case the components thereof are connected in parallel, or the voltage derived from the complex electric circuit in case the components thereof are connected in series, is measured.

This object is also attained in a device for effecting the method of measuring the parameters of a complex electric circuit, comprising: a keying unit, whose first input is connected to the output of a source of constant voltage, while the second input is grounded, connecting upon the arrival of a signal from the control unit, coinciding in time with an external signal, its first input to its output, the output of the keying unit being connected, via a complex electric circuit, to a lead of the reference element, electrically connected to the voltage measuring unit and to the comparison unit or via the reference element to the lead of the complex electric circuit, electrically connected to the voltage measuring unit and to the comparison unit the output thereof being connected to the output of the control unit, connected, in its turn, to the time interval measuring unit, according to the invention, comprising a d.c. amplifier featuring parallel negative feedback ensuring the electrical connection of a common point of the complex electric circuit and of the leadout of the reference element or of the reference element and of the leadout of the complex electric circuit, to the voltage measuring unit and to the comparison unit, which at the instants the output voltage derived from the d.c. amplifier alternately equals two reference voltages and zero, sends three signals respectively to the voltage measuring unit and the control unit, the latter governing the time interval measuring unit in such a manner that the beginning of the first time interval being measured coincides in time with the first signal derived from said comparison unit, while the end thereof coincides with the second signal, the beginning of the second time interval being measured coincides in time with the end of the calibrated time interval counted from the instant an external signal arrives, while the end thereof coincides in time with the third signal derived from said comparison unit, the control unit also changing the state of the keying unit, whereat after a calibrated time interval following the arrival of the external signal the output of the keying unit is connected to its third input, connected to a source of constant voltage of opposite polarity, at the instant the third signal arrives from the comparison unit, the output of the keying unit is connected to its second input, while the voltage measuring unit begins the measurement of the voltage across the output of the d.c. amplifier.

It is advantageous, in case the complex electric circuit is composed of RL components connected in parallel, to utilize a resistor as a reference element, connected into the parallel negative feedback circuit of the d.a. amplifier.

In case the complex electric circuit is composed of RC components connected in parallel, it is advantageous to utilize a capacitor as a reference element, connected into the parallel negative feedback circuit of the d.c. amplifier.

In case the complex electric circuit comprises RL components connected in series, it is expedient to connect the latter into the parallel negative feedback circuit of the d.c. amplifier, and to utilize an inductance coil as the reference element.

In case the complex electric circuit comprises RC components connected in series, it is advantageous to connect the latter into the parallel negative feedback circuit of the d.c. amplifier, and to utilize a resistor as the reference element.

The method of measuring the parameters of a complex electric circuit and device for effecting same hereinabove described make possible to increase the accuracy of measurements, cut down the time required to effect same, broaden the range and increase the number of parameters that can be measured. The device is also distinguished by simple construction and small overall dimensions.

The nature of the invention will be clear from the following description of embodiments thereof taken in conjunction with the accompanying drawings, wherein.

Figure 1:
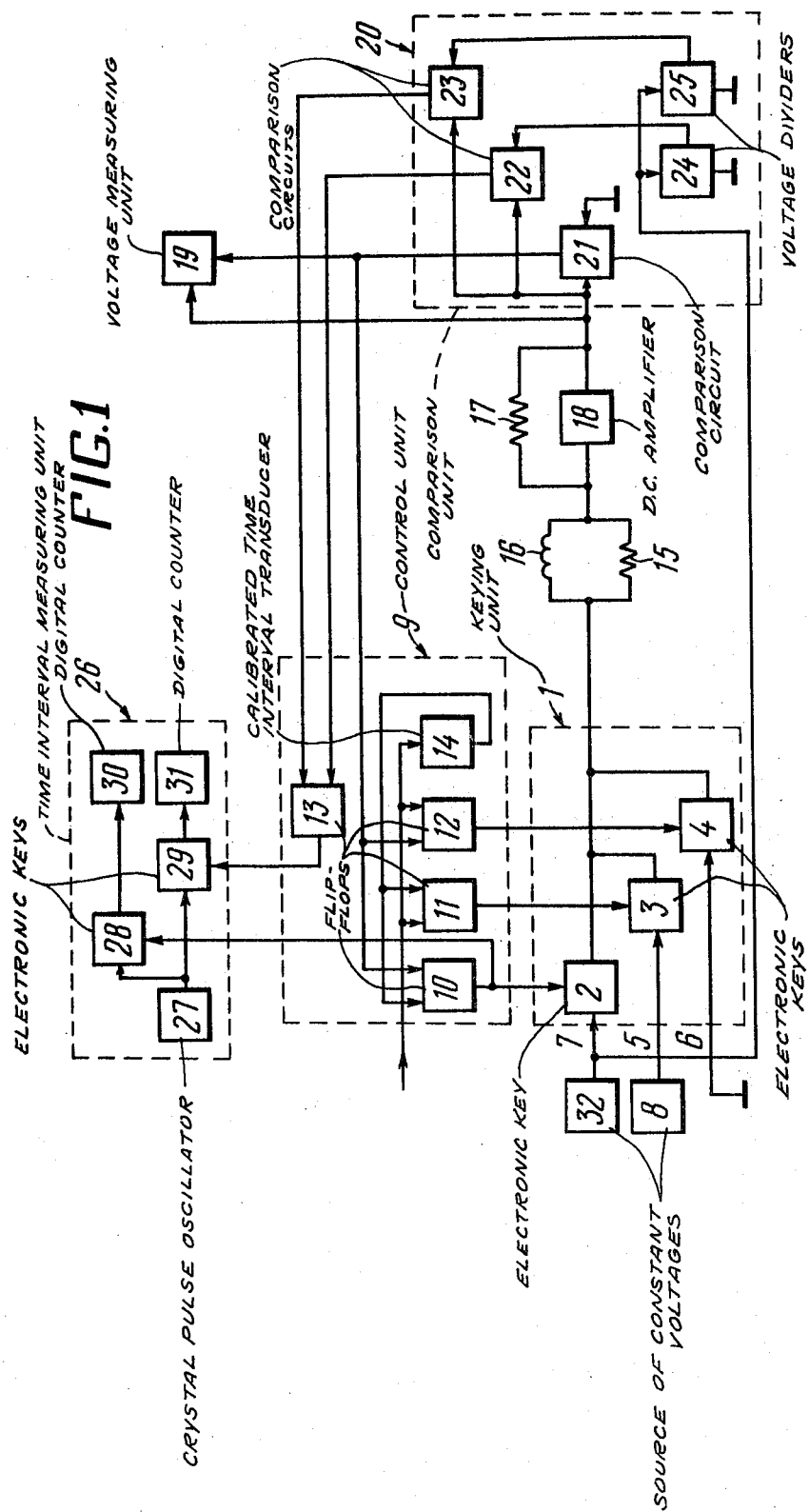
FIG. 1 is a functional diagram of the first embodiment of a device for effecting the method of measuring the paramenters of a complex electric circuit, according to the present invention.

The device executing the method of measuring the parameters of a complex electric circuit comprises a keying unit 1 (FIG. 1) consisting of electronic keys 2, 3 and 4, each utilizing one transistor; a first input 5 of the keying unit 1 being the input of the key 3, a second input 6 of the keying unit 1 being the input of the key 4, and a third input 7 of the keying unit 1 being the input of the key 2. The interconnected outputs of the keys 2, 3 and 4 serve as the output of the keying unit 1. The first input 5 of the keying unit 1 is connected to the output of a source of constant voltage 8, utilizing semi-conductor components wired according to a known circuit diagram, while the second input 6 is grounded.

The device is also provided with a control unit 9 consisting of flip-flops 10, 11, 12 and 13, and a calibrated time interval transducer 14 featuring, in the embodiment described, a single-shot multivibrator wired according to a known circuit diagram. An external signal generated by a source (not shown in the Figure) is applied to the unity input of the flip-flop 11, zero input of the flip-flop 12 and the input of the calibrated time interval transducer 14. The output of the transducer 14 is connected to the unity input of the flip-flop 10 and zero input of the flip-flop 11. The outputs of the flip-flops 10, 11 and 12 are connected to the control inputs of the keys 2, 3 and 4, respectively.

The output of the keying unit 1 is connected, by means of a complex electric circuit featuring a resistor 15 and an inductance coil 16 connected in parallel in the present embodiment of the invention, to a leadout of a reference element featuring a reference resistor 17 in the present embodiment of the invention, and to the input of a d.c. amplifier 18. The output of the latter is connected to a free leadout of the reference resistor 17, to the input of a voltage measuring unit 19 which is a digital voltmeter utilizing semi-conductor components wired according to a known circuit diagram, and to the input of a comparison unit 20, the latter comprising comparison circuits 21, 22 and 23 and voltage dividers 24, 25, each employing two resistors.

The d.c. amplifier 18 and each of the comparison circuits 21, 22 and 23 utilize a common integrated microcircuit.

One of the inputs of the comparison circuit 21 is grounded, one of the inputs of the comparison circuits 22 and 23 is connected respectively to the output of the voltage dividers 24 and 25, while the other inputs of the comparison circuits 21, 22 and 23 are combined into one and connected to the output of the d.c. amplifier 18. The output of the comparison unit 21 is connected to the zero input of the voltage measuring unit 19. The output of the comparison circuit 22 is connected to the unity input of the flip-flop 13, while the output of the comparison circuit 23 is connected to the zero input of the flip-flop 13.

The device is also provided with a time interval measuring unit 26 comprising a crystal pulse oscillator 27 utilizing semiconductor components wired according to a known circuit diagram, electronic keys 28 and 29 similar to the keys 2, 3 and 4 and decimal digital counters 30, 31 utilizing semiconductor flip-flops wired according to known circuit diagram. The output of the crystal pulse oscillator 27 is connected to the inputs of the keys 28 and 29, whose control inputs are connected respectively to the outputs of the flip-flops 10 and 13, while the outputs - to the inputs of the digital counters 30 and 31.

The third input 7 of the keying unit 1 is connected to the inputs of the voltage dividers 24 and 25 and the output of a source of constant voltage 32, similar to the source 8, but of reverse polarity.

Another embodiment of the device for executing the method of measuring the parameters of a complex electric circuit is possible, which is similar to the device hereinabove described.

It differs from the above device in that a resistor 33 (FIG. 2) and a capacitor 34 connected in parallel similarly to the resistor 15 (FIG. 1) and the inductance coil 16 are used as a complex electric circuit, the reference element being a reference capacitor 35 (FIG. 2), connected similarly to the reference resistor 17 (FIG. 1).

A third embodiment of the device effecting the method of measuring the parameters of a complex electric circuit is possible, similar to the device hereinabove described.

Figure 3:
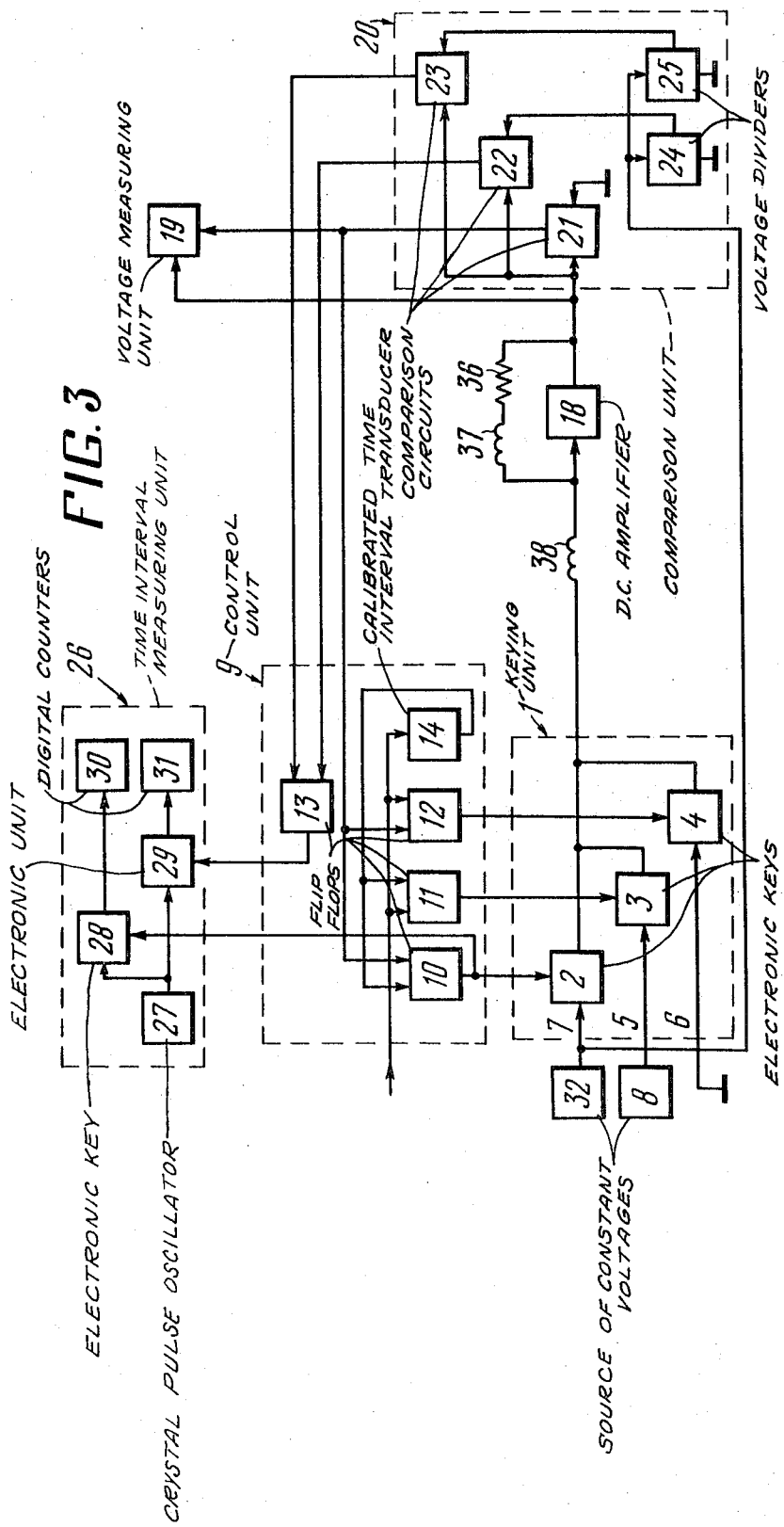
FIG. 3 is a functional diagram of the third embodiment of a device according to the present invention.

It differs from the above device in that a resistor 36 (FIG. 3) and an inductance coil 37 connected in series similarly to the reference resistor 17 (FIG. 1) are used as a complex electric circuit, the reference element being a reference inductance coil 38 (FIG. 3), connected similarly to the parallel resistor 15 (FIG. 1) and the inductance coil 16.

A fourth embodiment of the device effecting the method of measuring the parameters of a complex electric circuit can be provided, similar to the device hereinabove described.

Figure 4:
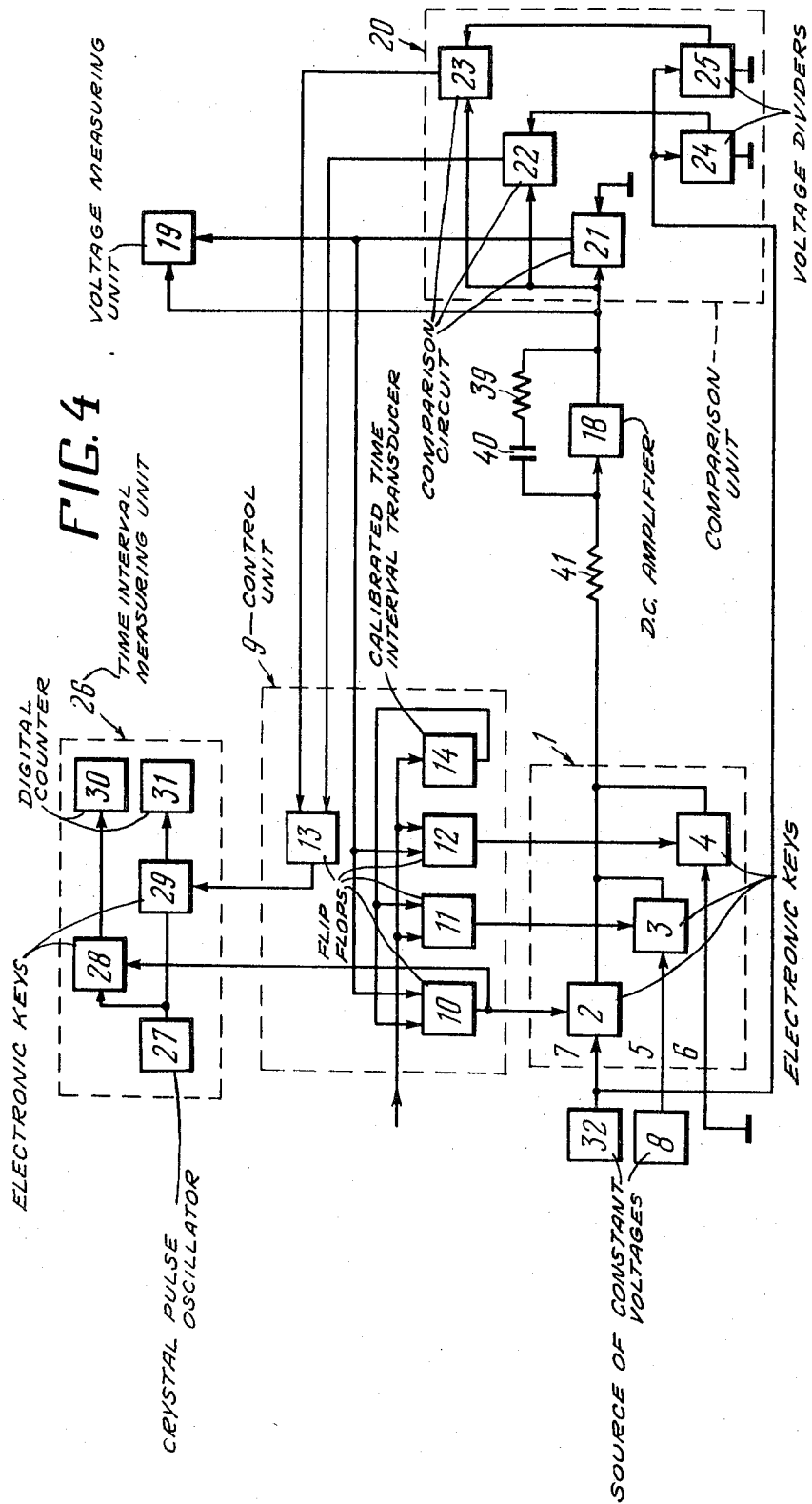
FIG. 4 is a functional diagram of the fourth embodiment of a device according to the present invention.

It differs from the above device in that a resistor 39 (FIG. 4) and a capacitor 40 connected in series similarly to the reference element 17 (FIG. 1) are used as a complex electric circuit, the reference element being a reference resistor 41 (FIG. 4), connected similarly to the parallel resistor 15 (FIG. 1) and the inductance coil 16.

The device for effecting the method of measuring the parameters of a complex electric circuit according to the present invention operates as follows.

An external signal generated by a source triggers the calibrated time interval transducer 14 (FIG. 1) of the control unit 9 and shifts the flip-flops 11 and 12, respectively, into the unity and zero states. The transducer 14 starts metering a calibrated time interval $T_o$, the voltage potential derived from the output of the flip-flop 11 which is in the unity state, makes the key 3 of the keying unit 1 conducting, while the voltage potential derived from the output of the flip-flop 12, makes the key 4 non-conducting. This results in that a constant voltage $-E_o$ derived from the output of the source of constant voltage 8 via the conducting key 3 is applied directly across the input of the complex electric circuit, made up of the resistor 15 having a resistance R and the inductance coil 16 having an inductance L, connected in parallel.

Figure 5:
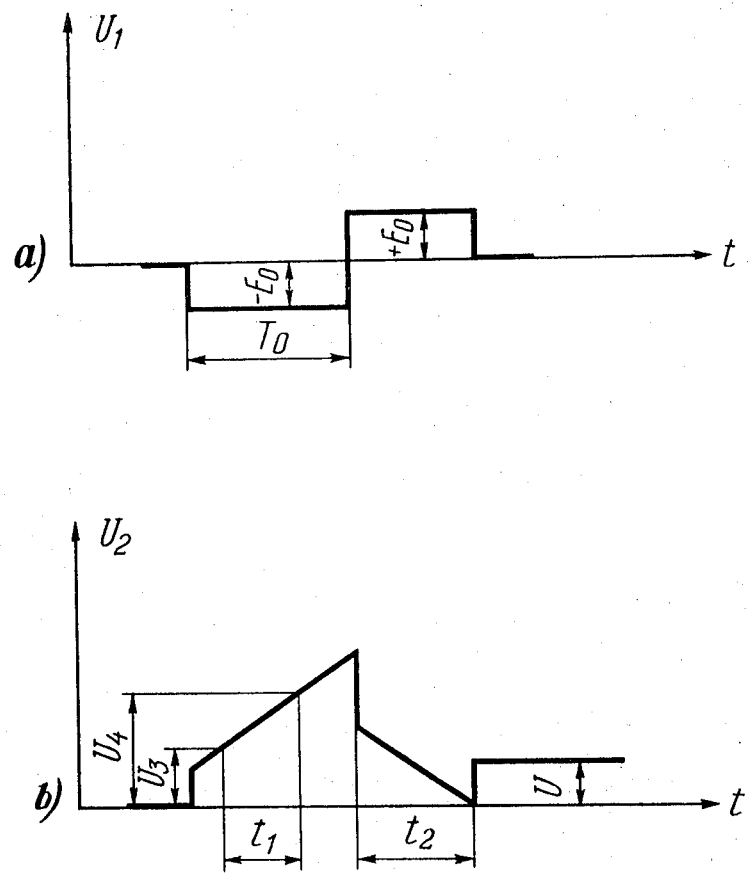
FIG. 5 represents time diagrams a and b of the voltages $U_1$ and $U_2$ respectively across the output of the keying unit and across the output of the d.c. amplifier.

To obtain a better understanding of the method of measuring the parameters of a complex electric circuit, there are shown in FIG. 5 the time diagrams a and b plotted along the abscissa and depicting the time, while along the ordinate, voltages $u_1$ and $u_2$ respectively, across the output of the keying unit and the output of the d.c. amplifier. The voltage $-E_o$ and time interval $I_0$ are shown in the diagram a.

The current flowing through the complex electric circuit is applied to the input of the d.c. amplifier 18, into whose parallel negative feedback circuit is included a reference resistor 17 having $R_o$ resistance. From the output of the d.c. amplifier 18 is derived a voltage $u_2$ (FIG. 5, diagram b), which is proportional to the current flowing through the complex electric circuit. Therefore, the comparison of this current with two reference currents is substituted by the comparison of voltage $U_2$ with two reference voltages using comparison circuits 22 and 23 of the comparison unit 20. To the other inputs of the comparison circuits 22 and 23 are applied reference voltages $U_3$ and $U_4$ ($U_4 > U_3 > (E_o R_o)/R$) derived from the voltage dividers 24 and 25 respectively, to whose inputs is applied reference voltage $+E_o$ derived from the source of constant voltage 32 whose polarity is opposite to that of the source 8. At the instant the reference voltage $U_3$ equals the voltage across the output of the d.c. amplifier, the comparison circuit 22 operates, the signal derived from its output shifting the flip-flop 13 into the unity state. The key 29 of the time interval measuring unit 26 becomes conducting and the pulses from the output of the crystal oscillator 27 start arriving at the input of the decimal digital counter 31, which starts measuring the time interval $t_1$ (FIG. 5, diagram b) between the moments of alternate equality of voltage at the output of the d.c. amplifier to two reference voltages. At the instant the reference voltage $U_4$ and the voltage at the output of the d.a. amplifier 18 become equal, the comparison circuit 23 operates, the signal derived from its output resetting the flip-flop 13 to zero. The key 29 becomes non-conducting and the decimal digital counter 31 finishes the measurement of the time interval $t_1$.

Following the metering of a calibrated time interval $T_o$ ($T_o > L/R$) at the output of the calibrated time interval transducer 14, a signal appears to shift the flip-flop 10 into the unity state and reset the flip-flop 11 to zero. The key 3 becomes non-conducting while the keys 2 and 28 become conducting, the pulses derived from the crystal pulse oscillator 27 start arriving at the input of the decimal digital counter 30 which starts measuring the time interval $t_2$ (FIG. 5, diagram b), while the output of the keying unit 1 becomes connected to its third input 7 via the conducting key 2. This causes the voltage $+E_o$ (FIG. 5, diagram a) of a reverse polarity as compared to that of the voltage applied earlier to be supplied to the complex electric circuit from the output of the source of constant voltage 32. The voltage $U_2$ (FIG. 5, diagram b) across the output of the d.c. amplifier 18 starts diminishing, and once it becomes equal to zero, which corresponds to a condition when the current flowing through the complex electric circuit equals zero, the comparison circuit 21, one of whose inputs is grounded, operates and the signal derived from its output resets the flip-flop 10 to zero and the flip-flop 11 to unity.

The keys 2 and 28 become non-conducting, while the key 4 starts conducting. The decimal digital counter 30 finishes the measurement of the time interval $t_2$ (FIG. 5, diagram b), the constant voltage supplied to the complex electric circuit is cut off, while the output of the keying unit 1 becomes connected to its second grounded input 6. Moreover, in response to a signal derived from the output of the comparison circuit 21 the voltage measuring unit 19 takes measurement of the voltage U, derived from the output of the d.c. amplifier 18 which is proportional to the current flowing through the complex electric circuit after the keying unit 1 has been connected to its second grounded input 6.

Basing on the time intervals $t_1$ and $t_2$ thus obtained and measured and on the voltage U, the value of inductance L of the inductance coil 16 of the complex electric circuit as well as the value of the time constant of the latter circuit and the value of conductance G = 1/R of the resistor 15 of this circuit can be determined unambiguously:

$t_1 = (U_4 - U_3)/(E_o \cdot R_o) \cdot L$;
$t_2 = T_o - L/R$;
$U = E_o \cdot R_o/R$ The operation of the second embodiment of a device for effecting the method of measuring the parameters of a complex electric circuit is similar to that hereinabove described, the only difference being in that owing to the incorporation of a capacitor 35 into the parallel negative feedback circuit of the d.c. amplifier 18 (FIG. 2), the output voltage thereof is proportional to the integral of current flowing through the complex electric circuit.

Basing on the time intervals $t_1$ and $t_2$ and voltage U thus obtained and measured, the value of resistance R of the resistor 33 of the complex electric circuit, as well as the value of the time constant of the latter and the value of capacitance C of the capacitor 34 of this circuit can be determined unambiguously:

$t_1 = (U_4 - U_3)/E_o \cdot C_o \cdot R$;
$t_2 = T_o - C \cdot R$;
$U = E_o \cdot C/C_o$ The operation of the third embodiment of the device is similar to that hereinabove described, the only difference being that owing to the incorporation of the inductance coil 38 (FIG. 3) as a reference element and the introduction of the series-connected resistor 36 and the inductance coil 37 of the complex electric circuit into the parallel negative feedback circuit of the d.c. amplifier 18, the complex electric circuit is fed with linearly changing current, while the output voltage of the amplifier 18 is equal to the voltage derived from the complex electric circuit.

Basing on the time intervals $t_1$ and $t_2$ and voltage U thus obtained and measured, the value of conductance $G = 1/R$ of the resistor 36 of the complex electric circuit, the value of the time constant of the latter, and the value of inductance L of the inductance coil 37 of this circuit can be determined unambiguously:

$t_1 = (U_4 - U_3)/(E_o \cdot R) \cdot L_o$;
$t_2 = T_o - L/R$;
$U = E_o \cdot L/L_o$ The operation of the fourth embodiment of the device for effecting the method of measuring the parameters of a complex electric circuit is similar to that hereinabove described, the only difference being in that owing to the incorporation of the resistor 41 (FIG. 4) as a reference element and the introduction of the series-connected resistor 39 and the capacitor 40 of the complex electric circuit into the parallel negative feedback circuit of the d.c. amplifier 18, the complex electric circuit is fed with constant current, while the output voltage of the amplifier 18 is equal to the voltage derived from the complex electric circuit.

Basing on the time intervals $t_1$ and $t_2$ and voltage U, the value of capacitance C of the capacitor 40 of the complex electric circuit, the value of the time constant of the latter and the value of resistance R of the resistor 39 of this circuit can be determined unambiguously:

$t_1 = (U_4 - U_3)/E_o \cdot R_o \cdot C$;
$t_2 = T_o - RC$;
$U = E_o \cdot R/R_o$ The method of measuring the parameters of a complex electric circuit and the device for effecting same according to the present invention feature quick action, a wide range of application and high accuracy of measurement.

In measuring the parameters of individual RCL elements, the method and the device according to the present invention make possible to increase the measurement accuracy due to the removal of errors during the conversion owing to losses through capacitors and inductance coils.

The method and device make also possible to reduce the power dissipated in the measuring electric circuit, thus allowing for measuring the parameters of film RC components and obtaining digital equivalents of signals produced by RCL microtransducers.

The device for executing the method of measuring the parameters of a complex electric circuit has a simple design and small overall dimensions.

Components of the apparatus consist of generally known components. Thus, the electronic keys, 2, 3, 4, 28, 29 as illustrated in the drawings, are described in "Analog and Analog — Digital Electronic Computers," G. Corn, T. Corn; Part I, Theory and Basic Functional Units; translated from the English; "Mir" Publishers, Moscow, 1967, page 302, fig. 6, 20g, which says, in particular (page 304, 12–15 lines from bottom): "In FIG. 6.20d and e, there is illustrated the other block diagram of the series Key /99/, in which the transistors are used with neutral switching on (their switching on is neither normal nor inverse)".

The D. C. voltage sources 8,32 are illustrated in the drawings and described in "Compensation Semiconductor Voltage and Current Stabilizers," V. I. Karpov; 2nd Edition, "Energia" Publishers, Moscow, 1967, p.99, FIG. 59, which in particular includes the quality indexes and points out: "the stabilizer having relatively power output possesses very high quality indexes; its voltage summary stability does not exceed 0.03 percent, that is the order of the 3d class normal element."

The pickup 14 of a calculated time interval is illustrated on the drawing and described in "Theory and calculation of integrated circuits based on semiconductors Devices," L. M. Goldenberg, "Svyaz," Publishers, Moscow, 1969, page 308, FIG. 5, 17g, which in particular points out (page 310, 4–11 lines from top) "In figure 5, 17 g there is illustrated the block diagram of one version of the flip-flop in which the circuit $CR_6$ is replaced by "NM," and the operation of the flip-flop as well.

Figure 2:
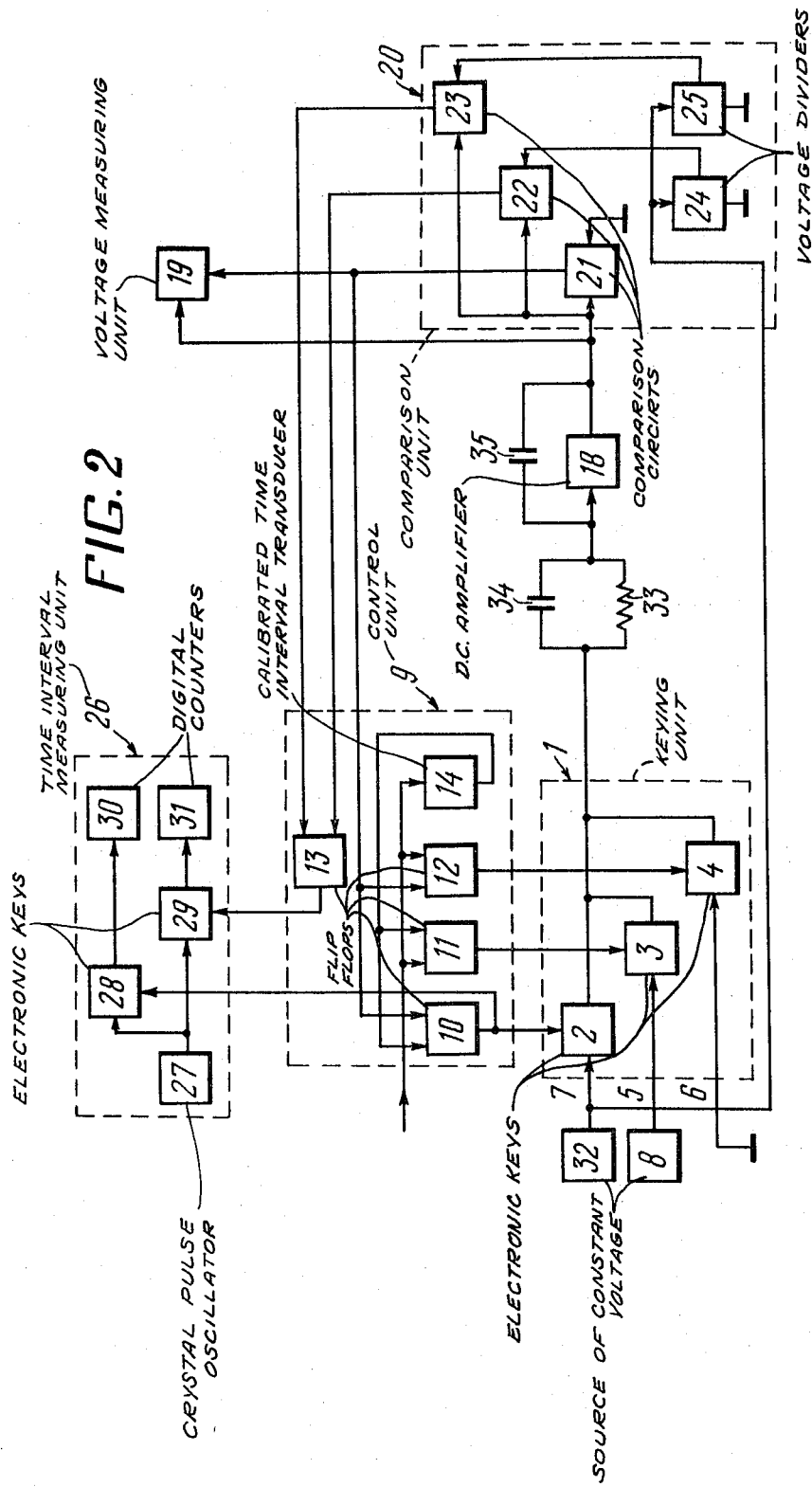
FIG. 2 is a functional diagram of the second embodiment of a device according to the present invention.

The comparison unit 21, 22, 23 is illustrated in the drawings and described in "Digital Measuring Converters and Instruments," V. M. Shlyandin; Vyshaya Shkola Publishers, Moscow, 1973, given for typesetting in Oct. 24, 1972 and sent to the press in Jan. 29, 1973 which in particular indicates that (page 104, 1–2 lines from bottom) "The block diagram of the simplest integrated differential amplifier 1Y T221 (N2222) is illustrated in FIG. 2, 34, a" and that (page 105, lines 9–10 from top) the circuit CY based on two integrated amplifiers IYT22I and integrated Schmidt trigger $T_2$ is illustrated in FIG. 2.34 b. In FIG. 2.35 of this book there is illustrated the block-diagram of the integrated differential amplifier 1YT401 which possesses the best characteristics (page 105, 14–17 lines from the bottom). In this work there are illustrated the parameters of the comparison unit on one amplifier ly 401 and an integrated Schmidt trigger (page 105, 1–3 lines from bottom, page 106, 1–2 lines from top.)

The quartz-crystal generator 27 is illustrated in the drawing and described in "Transistorized Pulse Generators," V. N. Yakovlev; 2nd Edition, "Teknika" Publishers, Kiev, 1968, page 286, FIG. 151a, which in particular states (page 285, 9–11 lines from top) that "the balanced multivibrator having a quartz resonator, switched on parallel to one of the capacitors, driven in time (FIG. 151a) provides rectangular for oscillations unlike an oscillatory circuit with duty ratio Q = 2 except the odd values. Furthermore, the operation of this multivibrator is described in detail on pages 285–292.

The digital counters 30, 31 are illustrated in the drawings and described in "Digital Indication," M. I. Lerner, A. G. Ryzhevsky, M. M. Shlyandin; "Energia" Publishers, Moscow, 1970, page 30, FIG. 2–19, which says in particular, that (page 31, lines 4–11 from top) "The transistor counting decades with an indicator in serial production are realized as: a counting decade — a decoder — a matching device — a digital indicator or a counting decade — a machining device — a decoder — a digital indicator. As an example one can illustrate the counting decade with the digital indicator, type 1NI (FIG. 2–19). The matching device of this decade is realized on high voltage transistors $PP_1$-$PP_8$, a diode decoder.

The unit 10 for measuring voltage is illustrated in the drawing and described in "Digital electromeasuring Devices," edited by V. M. Shlyandin, "Energia" Publishers, Moscow, 1972, FIGS. 3–47, pages 151–152, which in particular points out (page 151, 1–4 lines from bottom and page 152, 1–3 lines from top), that "Both in the USSR and abroad industry produces a number of digital voltmeters based on the time method of pulse conversion with linear reverse voltage. The Soviet digital voltmeters B7-8 /Λ, 3–61, 3–89, 3–90/ is a typical example of this. The block-diagram and the time diagram of its operation fig. illustrated in FIG. 3–47 a, b. There is then described the operation of this voltmeter.

What is claimed is:

1. A method of measuring the parameters of a complex electric circuit, comprising the steps of applying a constant voltage directly across its input in case the components thereof are connected in parallel; comparing the current flowing through the complex electric circuit in case the components thereof are connected in parallel, with two reference currents, one with the lesser value exceeding the constant component of said current; measuring the time interval between the instants said current equals said two reference currents; reversing the polarity of said constant voltage after a calibrated time interval which exceeds the value of the time component of the complex electric circuit counting from the instant said constant voltage is applied to said circuit; measuring another time interval counting from said instant of reversing the polarity of said constant voltage until the instant the current flowing through said complex electric circuit attains a value approximately equal to zero; cutting off said constant voltage supply; measuring the current flowing through the complex electric circuit, depending on whose value, in conjunction with the two measured time intervals, the parameters of the complex electric circuit are determined.

2. A method of measuring the parameters of a complex electric circuit, comprising the steps of applying a constant voltage directly across its input in case the components thereof are connected in parallel; comparing the integral of current flowing through the complex electric circuit, in case the components thereof are connected in parallel, with two reference currents, one with the lesser value exceeding the constant component of the current integral; measuring the time interval between the instant said integral of current equals two said reference currents; reversing the polarity of said constant voltage after a calibrated time interval, which exceeds the value of the time constant of the complex electric circuit counting from the instant said constant voltage is applied to said circuit; measuring another time interval counting from said instant of reversing the polarity of said constant voltage until the instant the integral of current flowing through said complex electric circuit attains a value approximately equal to zero; cutting off said constant voltage supply; measuring the integral of current flowing through the complex electric circuit, depending on whose value, in conjunction with the two measured time intervals, the parameters of the complex electric circuit are determined.

3. A method of measuring the parameters of a complex electric circuit, comprising the steps of applying a linearly changing current to a complex electric circuit in case the components thereof are connected in series, comparing the voltage derived from the complex electric circuit in case the components thereof are connected in series with two reference voltages, one with the lesser value exceeding the constant component of said voltage; measuring the time interval between the instants said voltage equals said two reference voltages; reversing the direction of said linearly changing current after a calibrated time interval which exceeds the value of the time constant of the complex electric circuit counting from the instant said linearly changing current is applied to said circuit; measuring another time interval counting from said instant of reversing the direction of said linearly changing current until the instant the voltage derived from the complex electric circuit attains a value approximately equal to zero; discontinuing the reversal of said linearly changing current; measuring the voltage derived from the complex electric circuit, depending on whose value, in conjunction with the two measured time intervals, the parameters of the complex electric circuit are determined.

4. A method of measuring the parameters of a complex electric circuit, comprising the steps of applying a constant current to a complex electric circuit in case the components thereof are connected in series; comparing the voltage derived from the complex electric circuit in case the components thereof are connected in series with two reference voltages, one with the lesser value exceeding the constant component of said voltage; measuring the time interval between the instants said voltage equals said two reference voltages; reversing the direction of said constant current after a calibrated time interval which exceeds the value of the time constant of the complex electric circuit conting from the instant said constant current is applied to said circuit; measuring another time interval counting from said instant of reversing the direction of said constant current until the voltage derived from the complex electric circuit attains a value approximately equal to zero; cutting off said constant current supply; measuring the voltage derived from the complex electric circuit, depending on whose value, in conjunction with the two measured time intervals, the parameters of the complex electric circuit are determined.

5. A device for measuring the parameters of a complex electric circuit in case the components thereof are connected in parallel, comprising: a source of constant voltage; a keying unit, whose first input is connected to the output of said source of constant voltage, while the second input is grounded; a reference element, to whose leadout is connected, via said complex electric circuit, the output of said keying unit; a voltage measuring unit electrically connected to the leadout of said reference element; a comparison unit also electrically connected to the leadout of said reference element a control unit, the input thereof being connected to the output of said comparison unit, and in response to a signal derived therefrom, coinciding in time with the arrival of an external signal, said keying unit connecting its first input to its output; a time interval measuring unit, the input thereof being connected to the output of said control unit; a d.c. amplifier featuring parallel negative feedback ensuring the electrical connection of a common point of the complex electric circuit and the leadout of said reference element to said voltage measuring unit and to the comparison unit said comparison unit, at the instants the output voltage derived from said d.c. amplifier alternately equals two reference voltages and zero, sending three signals respectively to said voltage measuring unit and said control unit, the latter governing said time interval measuring unit in such a manner that the beginning of the first time interval being measured coincides in time with the first signal derived from said comparison unit, while the end thereof coincides with the second signal, the beginning of the second time interval being measured coincides in time with the end of the calibrated time interval counted from the instant an external signal arrives, while the end thereof coincides with the third signal derived from said comparison unit, said control unit, changing the state of said keying unit, whereat after a calibrated time interval following the arrival of the external signal, the output of said keying unit is connected to its third input, connected to a source of constant voltage whose polarity is opposite to that of said source of constant voltage; said keying unit connecting, at the instant the third signal arrives from said comparison unit, its second input to its output, said voltage measuring unit beginning the measurement of voltage across the output of said d.c. amplifier.

6. A device as claimed in claim 5, wherein a resistor, included into the parallel negative feedback circuit of said d.c. amplifier, is used as said reference element.

7. A device for measuring the parameters of a complex electric circuit in case the components thereof are connected in parallel, comprising voltage; a keying unit, whose first input is connected to the output of said source of constant voltage while the second input is grounded; a reference element to whose leadout is connected, via said complex electric circuit, the output of said keying unit; a voltage measuring unit, electrically connected to the leadout of said reference element; a comparison unit, also electrically connected to the leadout of said reference element; a control unit, the input thereof being connected to the output of said comparison unit, and in response to a signal derived therefrom, coinciding in time with the arrival of an external signal, said keying unit connecting its first input to its output; a time interval measuring unit, the input thereof being connected to the output of said control unit; a d.c. amplifier featuring parallel negative feedback ensuring the electrical connection of a common point of the complex electric circuit and the leadout of said reference element to said voltage measuring unit and to the comparison unit; said comparison unit, at the instants the output voltage derived from said d.c. amplifier alternately equals two reference voltages and zero, sending three signals respectively to said voltage measuring unit and said control unit, the latter unit governing said time interval measuring unit in such a manner that the beginning of the first time interval being measured coincides in time with the first signal derived from said comparison unit, while the end thereof coincides with the second signal, the beginning of the second time interval being measured coincides in time with the end of the calibrated time interval counted from the instant an external signal arrives, while the end thereof coincides in time with the third signal derived from said comparison unit; said control unit, changing the state of said keying unit, whereat after a calibrated time interval following the arrival of the external signal the output of said keying unit is connected to its third input, connected to a source of constant voltage, whose polarity is opposite to that of said source of constant voltage; said keying unit connecting, at the instant the third signal arrives from said comparison unit, its second input to its output, said voltage measuring unit beginning the measurement of the voltage across the output of said d.c. amplifier.

8. A device as claimed in claim 7, wherein a capacitor, included into the parallel negative feedback circuit of said d.c. amplifier, is used as said reference element.

9. A device for measuring the parameters of a complex electric circuit in case the components thereof are connected in series, comprising: a source of constant voltage; a keying unit, whose first input is connected to the output of said source of constant voltage; while the second input is grounded a reference element, by whose means the output of said keying unit is connected to the leadout of said complex electric circuit; a voltage measuring unit electrically connected to the leadout of said complex electric circuit; a comparison unit, also electrically connected to the leadout of said complex electric circuit: a control unit, the input thereof being connected to the output of said comparison unit, and in response to a signal derived therefrom, coinciding in time with the arrival of an external signal, said keying unit connecting its first input to its output; a time interval measuring unit, the input thereof being connected to the output of said control unit; a d.c. amplifier featuring parallel negative feedback ensuring the electrical connection of a common point of the reference element and of the leadout of the complex electric circuit to said voltage measuring unit and to the comparison unit; said comparison unit, at the instants the output voltage of said amplifier alternately equals two reference voltages and zero, sending three signals respectively to said voltage measuring unit and said control unit, the latter unit governing said time interval measuring unit in such a manner that the beginning of the first time interval being measured coincides in time with the first signal derived from said comparison unit, while the end thereof coincides with the second signal, the beginning of the second time interval being measured coincides in time with the end of the calibrated time interval counted from the instant an external signal arrives, while the end thereof coincides in time with the third signal derived from said comparison unit; said control, unit changing the stage of said keying unit, whereat after a calibrated time interval following the arrival of the external signal, the output of said keying unit is connected to its third input, connected to a source of constant voltage, whose polarity is opposite to that of said source of constant voltate; said keying unit connecting, at the instant the third signal arrives from the comparison unit, its second input to its output, said voltage measuring unit beginning the measurement of the voltage across the output of said d.c. amplifier.

10. A device as claimed in claim 1, wherein series-connected RL components are included into the parallel negative feedback circuit of said d.c. amplifier, while an inductance coil is used as said reference element.

11. A device for measuring the parameters of a complex electric circuit in case the components thereof are connected in series, comprising: a source of constant voltage; a keying unit, whose first input is connected to the output of said source of constant voltage, while the second input is grounded; a reference element, by whose means of the output of said keying unit is connected to the leadout of said complex electric circuit; a voltage measuring unit electrically connected to the leadout of said complex electric circuit; a comparison unit, also electrically connected to the leadout of said complex electric circuit; a control unit, the input thereof being connected to the output of said comparison unit, and in response to a signal derived therefrom, coinciding in time with the arrival of an external signal, said keying unit connecting its first input to its output; a time interval measuring unit, the input thereof being connected to the output of said control unit; a d.c. amplifier featuring parallel negative feedback ensuring the electrical connection of a common point of said reference element and of the leadout of the complex electric circuit to said voltage measuring unit and to the comparison unit; said comparison unit at the instant the output voltage of said amplifier alternately equals two reference voltages and zero, sending three signals respectively to said voltage measuring unit and said control unit, the latter unit governing said time interval measuring unit in such a manner that the beginning of the first time interval being measured coincides in time with the first signal derived from said comparison unit, while the end thereof coincides with the second signal, the beginning of the second time interval being measured coincides in time with the end of the calibrated time interval counted from the instant an external signal arrives, while the end thereof coincides in time with the third signal derived from said comparison unit; said control unit changing the state of said keying unit, whereat after a calibrated time interval following the arrival of the external signal, the output of said keying unit is connected to its third input, connected to a source of constant voltage, whose polarity is opposite to that of said source of constant voltage; said keying unit connecting, at the instant the third signal arrives from said comparison unit, its second input to its output, said voltage measuring unit beginning the measurement of the voltage across the output of said d.c. amplifier.

12. A device as claimed in claim 11, wherein series-connected RC components are included into the parallel negative feedback circuit of said d.c. amplifier, while a resistor is used as said reference element.

* * * * *